US007365723B2

(12) United States Patent
Lee et al.

(10) Patent No.: US 7,365,723 B2
(45) Date of Patent: Apr. 29, 2008

(54) LIQUID CRYSTAL DISPLAY AND DRIVING METHOD THEREOF

(75) Inventors: Seung-Woo Lee, Seoul (KR); Yun-Ju Yu, Seoul (KR); Doo-Sik Park, Suwon (KR); Jong-Seon Kim, Pyeongtaek (KR); Heui-Keun Choh, Seoul (KR); Chang-Yeong Kim, Yongin (KR)

(73) Assignee: Samsung Electronics Co., Ltd. (KR)

( * ) Notice: Subject to any disclaimer, the term of this patent is extended or adjusted under 35 U.S.C. 154(b) by 453 days.

(21) Appl. No.: 10/704,828

(22) Filed: Nov. 12, 2003

(65) Prior Publication Data

US 2005/0057472 A1 Mar. 17, 2005

(30) Foreign Application Priority Data

Nov. 12, 2002 (KR) ...................... 10-2002-0070050

(51) Int. Cl.
*G09G 3/36* (2006.01)
*G09G 5/00* (2006.01)
*G09G 5/10* (2006.01)
*G06F 3/038* (2006.01)

(52) U.S. Cl. ............................ 345/89; 345/87; 345/88; 345/204; 345/690

(58) Field of Classification Search ................... 345/89
See application file for complete search history.

(56) References Cited

U.S. PATENT DOCUMENTS 5,483,256 A 1/1996 Ohi
5,546,101 A 8/1996 Sugawara
5,910,806 A * 6/1999 Narui et al. ................ 345/536

(Continued)

FOREIGN PATENT DOCUMENTS

JP 05014654 A * 1/1993

(Continued)

OTHER PUBLICATIONS

Stokes, Michael; Anderson, Matthew; Chandrasekar, Srinivasan; Motta, Ricardo. "A Standard Default Color Space for the Internet—sRGB" Version 1.10. Nov. 5, 1996.*

(Continued)

*Primary Examiner*—Sumati Lefkowitz
*Assistant Examiner*—Alexander S. Beck
(74) *Attorney, Agent, or Firm*—Don C. Lawrence; MacPherson Kwok Chen & Heid LLP

(57) ABSTRACT

A liquid crystal display includes a signal controller having a luminance controller receiving image data from an external graphic source and controlling the luminance of the image data such that the luminance at the gray expressed by a specific data value of the image data is established to be 80 cd/m$^2$, and a gamma converter outputting image data each having a gamma characteristic adapted to a gamma 2.2 curve. The gamma converter output is determined without using a look up table based on at least one difference curve having a linear portion, a quartic portion, and a critical value where the liner portion and the quartic portion intersect. The liquid crystal display further includes a data driver receiving the image data for selecting and outputting gray voltages corresponding to the image data, and an inverter controlling a lamp to emit light with a luminance of 80 cd/m$^2$ or more.

16 Claims, 7 Drawing Sheets

U.S. PATENT DOCUMENTS

| | | | | |
|---|---|---|---|---|
| 6,188,380 | B1 * | 2/2001 | Kawashima et al. | 345/102 |
| 6,215,468 | B1 * | 4/2001 | Van Mourik | 345/605 |
| 6,249,328 | B1 | 6/2001 | Fukuzawa | |
| 6,462,735 | B2 * | 10/2002 | Naito | 345/204 |
| 6,987,499 | B2 * | 1/2006 | Yamaguchi et al. | 345/89 |
| 2001/0052955 | A1 | 12/2001 | Nagatani | |
| 2001/0055007 | A1 | 12/2001 | Miura et al. | |
| 2002/0003594 | A1 | 1/2002 | Ishii et al. | |
| 2002/0130830 | A1 * | 9/2002 | Park | 345/99 |
| 2002/0154088 | A1 | 10/2002 | Nishimura | |

FOREIGN PATENT DOCUMENTS

| | | |
|---|---|---|
| JP | 11-031589 | 2/1999 |
| JP | 2001284060 | 10/2001 |
| JP | 2001335516 | 12/2001 |
| KR | 100205934 | 4/1999 |
| KR | 100269256 | 7/2000 |
| KR | 1020010088300 | 9/2001 |

OTHER PUBLICATIONS

Gaurav Sharma, “LCDs Versus CRTs-Color-Calibration and Gamut Considerations”, Proceedings of the IEEE, vol. 90, No. 4, Apr. 2002 (pp. 605-622).

* cited by examiner

LIQUID CRYSTAL DISPLAY AND DRIVING METHOD THEREOF

CROSS REFERENCE TO RELATED APPLICATION

This application is based on Korea Patent Application No. 2002-0070050 filed on Nov. 12, 2002 in the Korean Intellectual Property Office, the content of which is incorporated herein by reference.

BACKGROUND OF THE INVENTION (a) Field of the Invention

The present invention relates to a liquid crystal display and a driving method thereof.

(b) Description of the Related Art

Recently, in the field of a display device such as a personal computer and a television, it is required that the display device should involve a light weight, a thin thickness and a large screen size. In order to fulfill such requirements, a flat panel display such as a liquid crystal display (LCD) has been developed instead of the cathode ray tube, and applied for practical use in the field of computers, and televisions.

The LCD has a panel with a matrix-typed pixel pattern, and a counter panel facing the former panel. A liquid crystal material bearing a dielectric anisotropy is injected between the two panels. The light transmission through the panels is controlled through varying the strength of the electric fields applied to both ends of the two panels, thereby displaying the desired images.

The display device usually represents original images on the screen by way of the RGB color space intrinsic thereto. That is, when the color space is expressed by way of a plurality of gray levels, gamma correction is made by way of a luminance curve corresponding to each gray level, that is, by way of a gamma curve. A color correction is additionally made, thereby recovering the original images. However, as the RGB color space is mostly device-dependent, the designer of the display device as well as the user thereof should consider the image profile intrinsic to the device when the original images are represented. This is a considerable burden to them. As the kind and the characteristic of the display device are diversified in various manners, it is needed to make a definition of a standard color space for the display device. In this connection, a sRGB color space being the unit standard RGB color space as the average concept of the RGB monitors was proposed on November, 1996 by the HP Company and the MS Company. Since then, the sRGB color space has been accepted as a standard color space on Internet.

A need is made to realize such a sRGB color space with the LCD.

Three requirements should be fulfilled to realize the sRGB color space with the LCD. First, the display luminance level with respect to the maximum input gray level should be established to be 80 cd/$m^2$. Second, the gamma curve expressing the luminance characteristic of the input gray level should agree to the gamma 2.2 curve. Third, the display model offset with respect to the RGB colors should be established to be zero.

It is required for the LCD to realize such a sRGB color space.

SUMMARY OF THE INVENTION

It is a motivation of the present invention to provide a liquid crystal display which realizes a sRGB color space, and a driving method thereof.

The liquid crystal display includes a signal controller having a luminance controller receiving image data from an external graphic source and controlling the luminance of the image data such that the luminance at the gray expressed by a specific data value of the image data is established to be 80 cd/$m^2$, and a gamma converter outputting image data each having a gamma characteristic adapted to a gamma 2.2 curve. The gamma converter output is determined without using a look up table based on at least one difference curve, where the at least one difference curve has a linear portion, a quartic portion, and a critical value where the linear portion and the quartic portion intersect.

The liquid crystal display further includes a data driver receiving the image data from the signal controller and selecting and outputting gray voltages corresponding to the image data, and an inverter controlling a lamp such that the lamp emits light with a luminance of 80 cd/$m^2$ or more.

With the liquid crystal display, the luminance of a backlight is determined to be a specific value larger than 80 cd/$m^2$, and the luminance of the input image data is controlled such that the luminance thereof at the specific data value is established to be 80 cd/$m^2$. Furthermore, the gamma characteristic of the image data RGB is converted to be adapted to the gamma 2.2 curve required for the sRGB color space. The gamma converter output is determined without using a look up table based on at least one difference curve, and the at least one difference curve has a linear portion, a quartic portion, and a critical value where the linear portion and the quartic portion intersect. In this way, the sRGB mode is realized with the liquid crystal display, and the display quality of the liquid crystal display can be improved.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
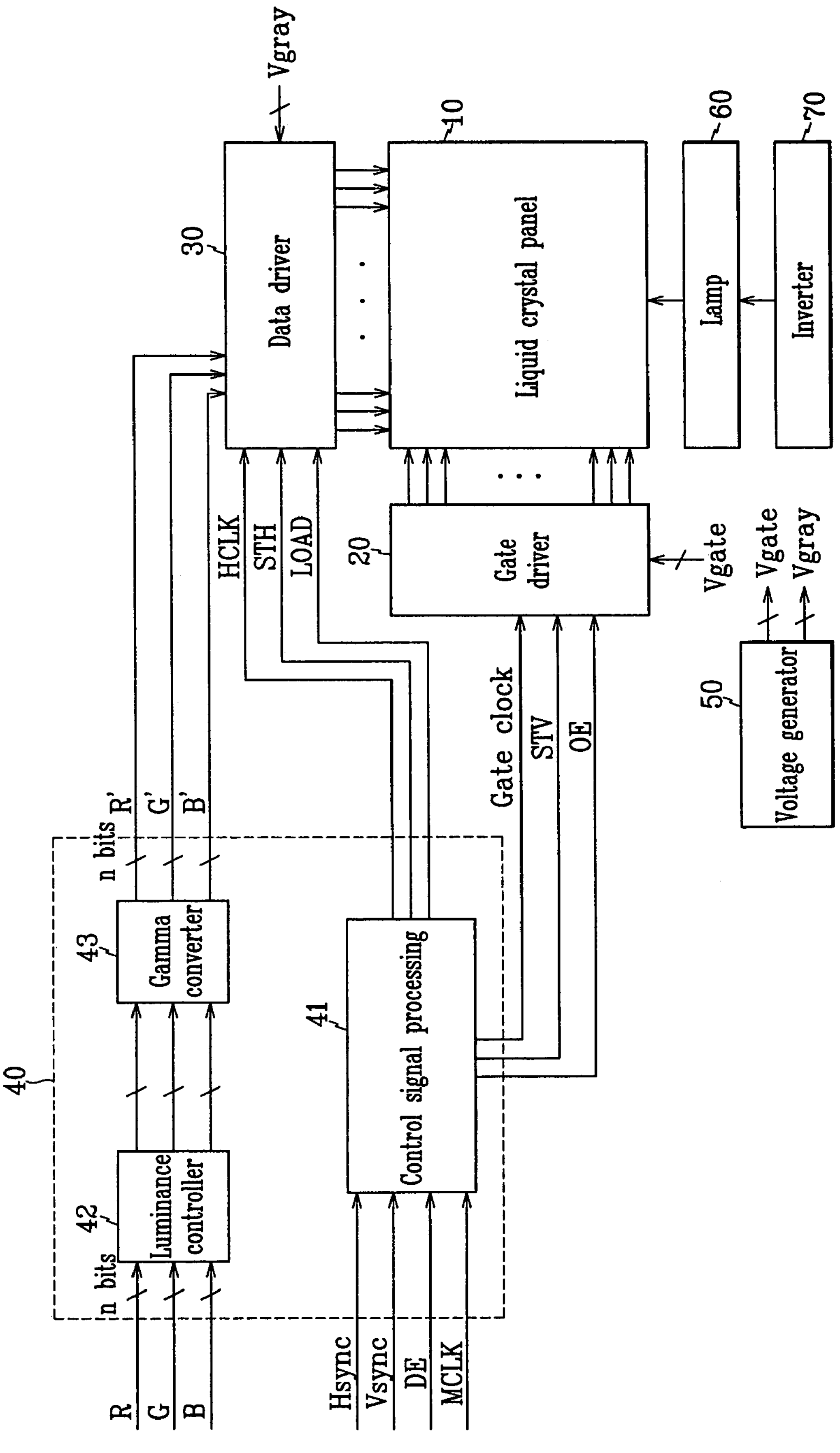
FIG. 1 is a block diagram of an LCD according to an embodiment of the present invention.

The present invention now will be described more filly hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, liquid crystal displays and driving methods thereof according to embodiments of the present invention will be described with reference to the accompanying drawings.

FIG. 1 is a block diagram of an LCD according to an embodiment of the present invention.

As shown in FIG. 1, an LCD according to an embodiment of the present invention includes a liquid crystal panel assembly 10, a gate driver 20, a data driver 30, a signal controller 40, a voltage generator 50, a lamp 60, and an inverter 70.

The liquid crystal panel assembly 10 includes a plurality of gate lines (not shown) extending in a transverse direction and transmitting gate voltages, a plurality of data lines (not shown) extending in a longitudinal direction and transmitting data voltages, and a plurality of pixels (not shown) connected to the gate lines and the data lines and arranged in a matrix. Each pixel includes a liquid crystal capacitor (not shown) and a switching element such as a thin film transistor (TFT) selectively transmitting the data voltages to the liquid crystal capacitor in response to the gate voltages.

The signal controller 40 receives image data RGB from an external graphic source (not shown) together with input control signals such as synchronization signals Hsync and Vsync, a data enable signal DE, and a clock signal MCLK for displaying the image data RGB. The signal controller 40 performs luminance control and gamma correction on the image data RGB to obtain corrected image data R'G'B', and outputs the corrected image data R'G'B' to the data driver 30. Furthermore, the signal controller 40 generates control signals such as a horizontal clock signal HCLK, a horizontal synchronization start signal STH, a load signal LOAD, a gate clock signal Gate clock, a vertical synchronization start signal STV, and an output enable signal OE for controlling the display operations of the gate driver 20 and the data driver 30, and outputs them to the relevant drivers 20 and 30.

The signal controller 40 includes a control signal processing block 41 and a data processing block including a luminance controller 42, and the gamma converter 43.

The control signal processing block 41 generates the control signals HCLK, STH, LOAD, Gate clock, STV and OE based on the synchronization signals Hsync and Vsync, the data enable signal DE, and the clock signal MCLK.

The luminance controller 42 controls the luminance of the image data RGB such that the luminance represented by a predetermined gray value (or data value) of the image data RGB be about 80 cd/$m^2$. The luminance control of the luminance controller 42 is described with reference to FIG. 2A, which is an exemplary graph illustrating luminance of an LCD as function of gray.

Figure 2A:
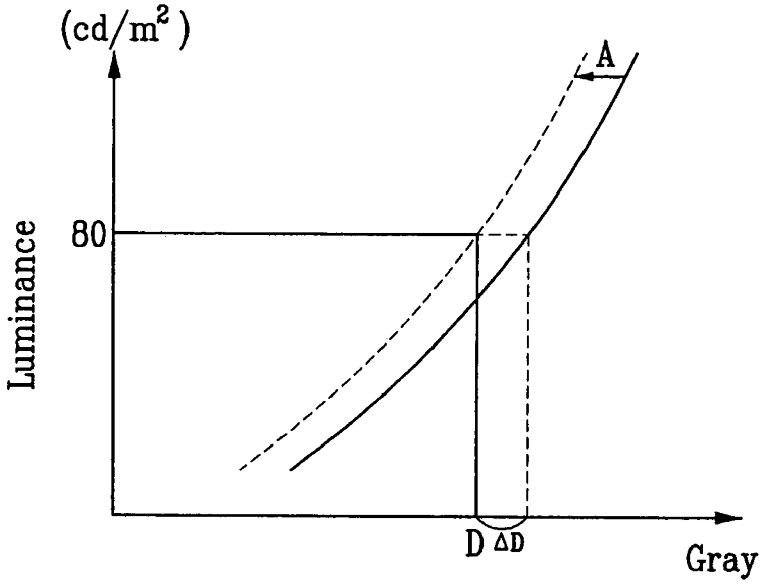
FIG. 2A is an exemplary graph illustrating luminance of an LCD as function of gray.

As shown from a solid curve in FIG. 2A, it is assumed that the luminance represented by a predetermined gray D is smaller than 80 cd/$m^2$, while the gray D+ΔD represent the luminance of 80 cd/$m^2$. The luminance controller 42 performs the luminance control by adding the value AD into input image data such that the luminance represented by the gray D of the predetermined input image data reach 80 cd/$m^2$. Therefore, the luminance control moves the solid luminance curve in a direction A to a dotted luminance curve. The predetermined gray D is preferably a maximum gray.

The gamma converter 43 converts a gamma characteristic of the image data from the luminance controller 42 such that it is adapted to a gamma 2.2 curve, and it outputs the converted image data R'G'B' to the data driver 30. The gamma converter 43 may perform the gamma conversion by way of a look-up table (LUT) or a mathematical operation realized on an application specific integrated circuit (ASIC). The configuration shown in FIG. 1 is obtained when using a look-up table. In this case, the look-up table includes a mapping from the original (input) image data RGB to the converted (output) image data R'G'B'. The gamma converter 42 retrieves a converted data corresponding to an input image data from the look-up table, and it outputs the converted image data. Although FIG. 1 shows that the bit number (n bits) of the converted image data R'G'B' is equal to the bit number (n bits) of the original image data RGB, the bit number of the converted image data RGB may be larger than the bit number of the original image data RGB in order to enhance the precision of the gamma conversion.

Figure 2B:
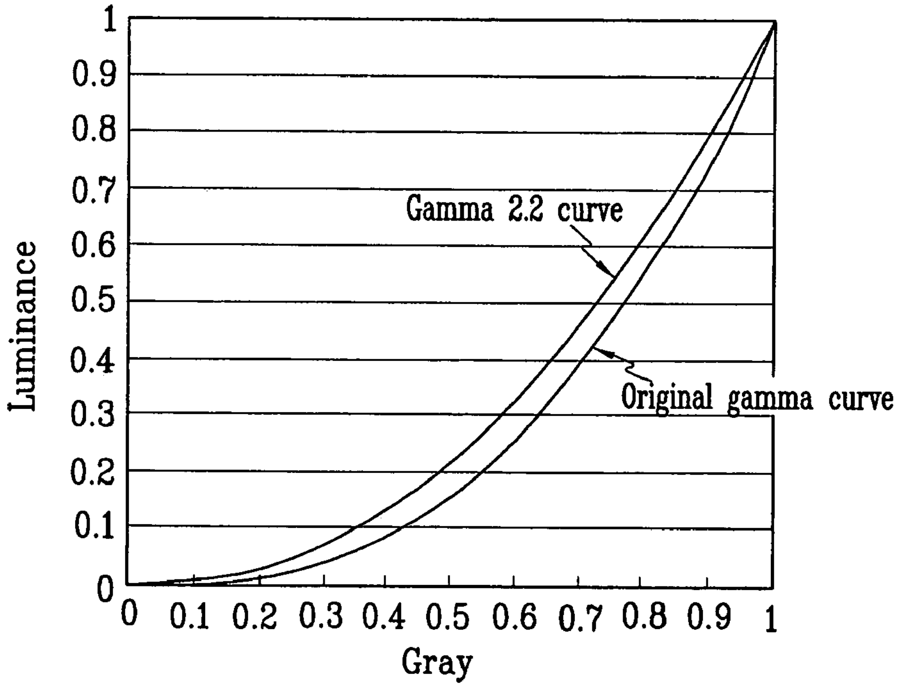
FIG. 2B shows an exemplary graph illustrating gamma curves of an LCD including an original gamma curve and a gamma 2.2 curve for sRGB color space.

FIG. 2B shows an exemplary graph illustrating gamma curves of an LCD including an original gamma curve and a gamma 2.2 curve for a standard RGB (sRGB) color space. In the figure, a horizontal axis indicates a normalized input gray level while a vertical axis indicates a normalized luminance.

The data driver 30 receives and stores the converted image data R'G'B' from the gamma converter 43 of the signal controller 40 in synchronization with the control signals HCLK and STH. The data driver 30 receives a plurality of gray voltages Vgray, which are analog voltages to be actually applied to the liquid crystal panel assembly 10, from the voltage generator 50. The data driver 30 selects the gray voltages Vgray corresponding to the image data R'G'B' for the respective pixels, and outputs the selected gray voltages as the data voltages to the liquid crystal panel assembly 10 in response to the load signal LOAD.

The gate driver 20 receives the gate clock signal Gate clock, the output enable signal OE, and the vertical synchronization start signal STV from the signal controller 40, and it also receives gate voltages Vgate from the voltage generator 50. The gate driver 20 sequentially outputs the gate voltages for selecting the gate lines on the liquid crystal panel assembly 10 in accordance with the output enable signal OE and the gate clock signal Gate clock, thereby sequentially scanning the gate lines on the liquid crystal panel assembly 10.

The lamp 60 and the inverter 70 form a backlight for the liquid crystal panel assembly 10, and the inverter 70 controls the light emission of the lamp 60. In this embodiment, it is established that the inverter 70 controls the lamp 60 with a luminance of 80 cd/$m^2$ or more to fulfill the luminance requirement of the sRGB color space.

When a gate line is selected by the gate voltages Vgate, the pixels connected to the gate line become in a write-enable state to be applied with the data voltages through the data lines. The pixels display predetermined luminance levels corresponding to the data voltages and a desired image is displayed on an entire screen in such a way.

Figure 3:
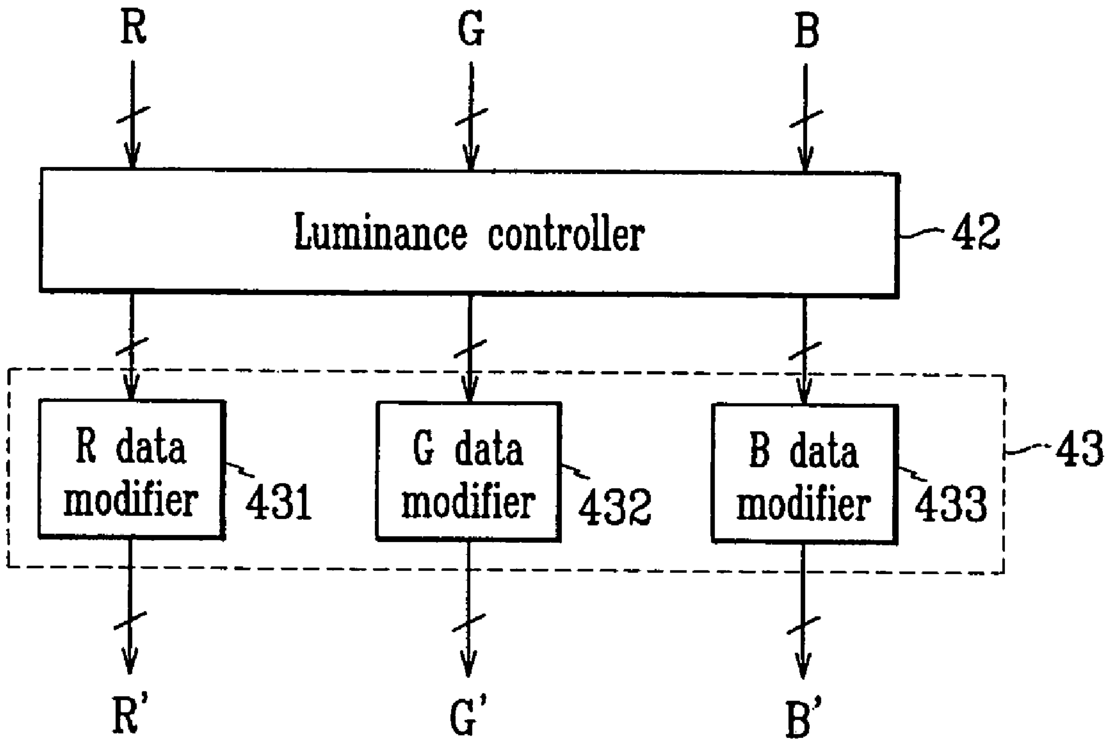
FIG. 3 is a detailed block diagram of the luminance controller and the gamma converter shown in FIG. 1.
Figure 4:
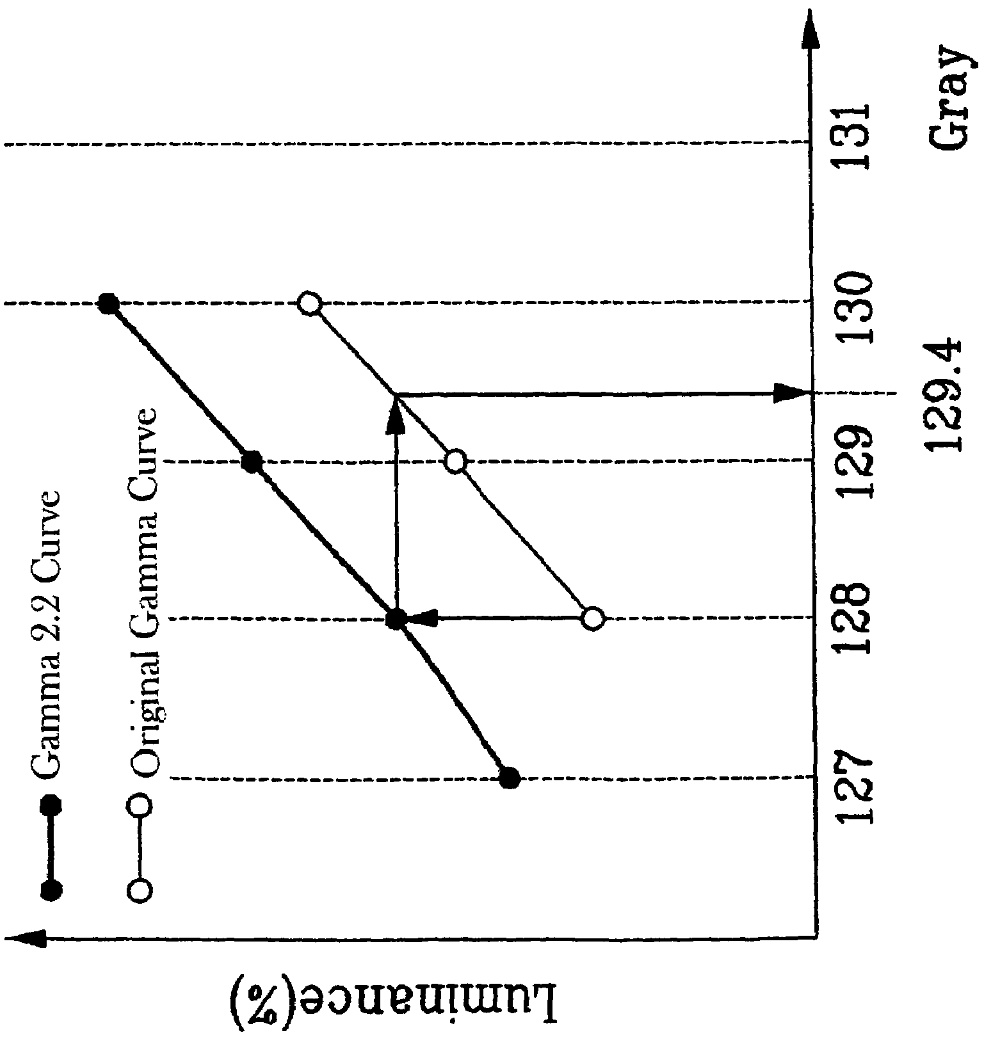
FIG. 4 is a graph showing a gamma 2.2 curve and an original gamma curve for illustrating the conversion of the gamma curve at the gamma converter shown in FIG. 3.

The operation of the gamma converter 43 will be now described more in detail with reference to FIGS. 3 and 4.

FIG. 3 is a detailed block diagram of the luminance controller 42 and the gamma converter 43 shown in FIG. 1, and FIG. 4 is a graph showing a gamma 2.2 curve and an original gamma curve for illustrating the conversion of the gamma curve at the gamma converter 43 shown in FIG. 3.

As shown in FIG. 3, the gamma converter 43 includes an R data modifier 431, a G data modifier 432, and a B data modifier 433. The data modifiers 431-433 perform the conversion of the gamma characteristics in relation to the respective RGB colors.

More specifically, each data modifier 431-433 maps an input image data representing a luminance level on the gamma 2.2 curve into an output image data representing the same luminance level on the original gamma curve. As shown in FIG. 4, it is assumed that the gray level of the input image data is 128. The luminance of the 128-th gray level on the original gamma curve is different from the luminance of the 128-th gray level on the gamma 2.2 curve. Instead, the 129.4-th gray level on the original gamma curve represents the same luminance as the 128-th gray level on the gamma 2.2 curve. Each data modifier 431-433 maps the input image data with the 128-th gray level into the output image data with the 129.4-th gray level. For this purpose, each data modifier 431-433 includes a look-up table including a map between gray levels on the gamma 2.2 curve and gray levels on the original gamma curve, which represent equal luminance. The look-up tables for the data modifiers 431-433 may be implemented in respective non-volatile memories such as ROM (read only memory) or implemented in one ROM. In order to enhance the precision of the gamma conversion, the bit number of the output image data is larger than that of the input image data such that decimals under the decimal point of the gray levels as shown in FIG. 4 can be expressed.

Figure 5:
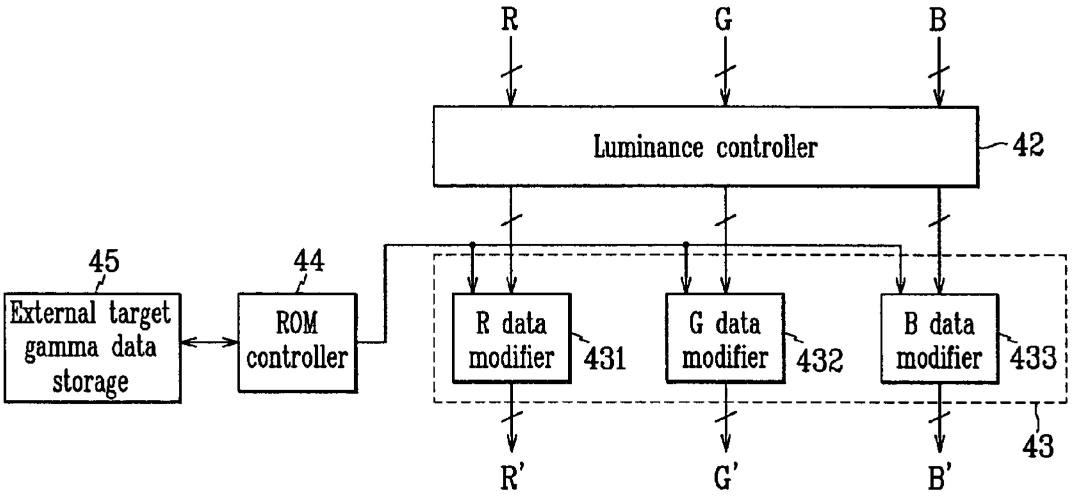
FIGS. 5 and 6 are block diagrams of an LCD according to other embodiments of the present invention.
Figure 6:
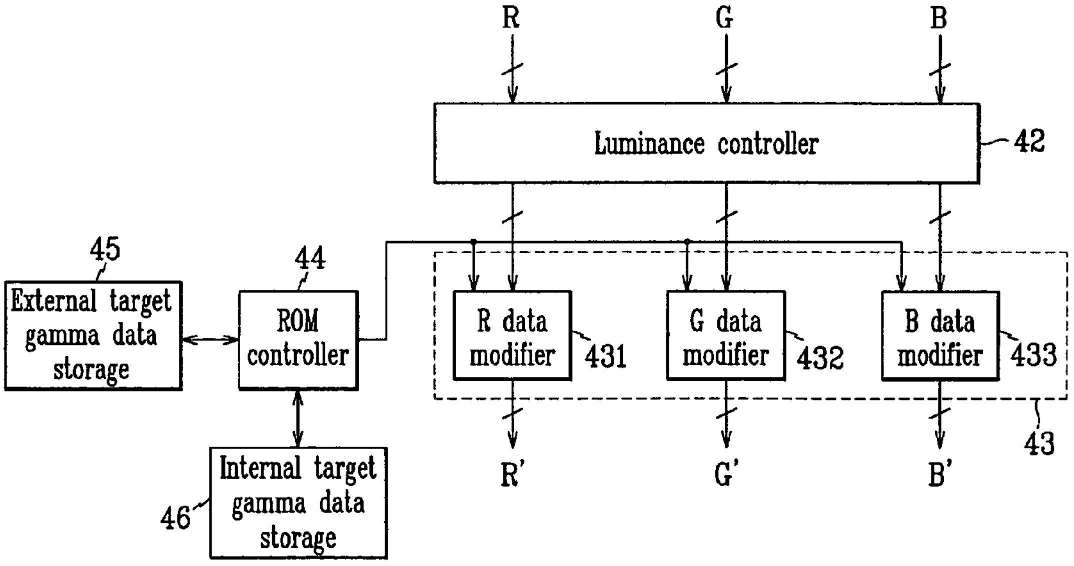

FIGS. 5 and 6 are block diagrams of an LCD according to other embodiments of the present invention.

The LCD shown in FIG. 5 further includes a ROM controller 44 and an external target image data storage 45 in addition to a gamma converter 43. The gamma converter 43 includes R, G and B data modifiers 431-433, each including a volatile memory such as a random access memory (RAM).

The external target image data storage 45 stores a look-up table including a map between gray levels on the gamma 2.2 curve and gray levels on the original gamma curve for each color, which represent equal luminance. The ROM controller 44 loads the look-up table in the storage 45 into the R, G and B data modifiers 431-433. Since the other operations are similar to those shown in FIG. 3, the description thereof is omitted here.

Since the look-up table is stored in the external storage 45, this embodiment easily copes with the alteration of the panel assembly 10 without changing the gamma converter 43.

The LCD shown in FIG. 6 further includes an internal target image data storage 46 as well as a ROM controller 44, an external target image data storage 45 in addition to a gamma converter 43 as compared with the LCD shown in FIG. 5. The gamma converter 43 also includes R, G and B data modifiers 431-433, each including a volatile memory such as a random access memory (RAM).

Like the external target image data storage 45, the internal target image data storage 46 stores a look-up table including the above-described map. The ROM controller 44 loads the look-up table stored in the external storage 45 or in the internal storage 46 into the R, G and B data modifiers 431-433. Other operations are similar to those shown in FIG. 3, and hence, description thereof will be omitted here.

Now, gamma conversion by way of a mathematical operation according to an embodiment of the present invention will be described with reference to FIGS. 7 and 8.

Figure 7:
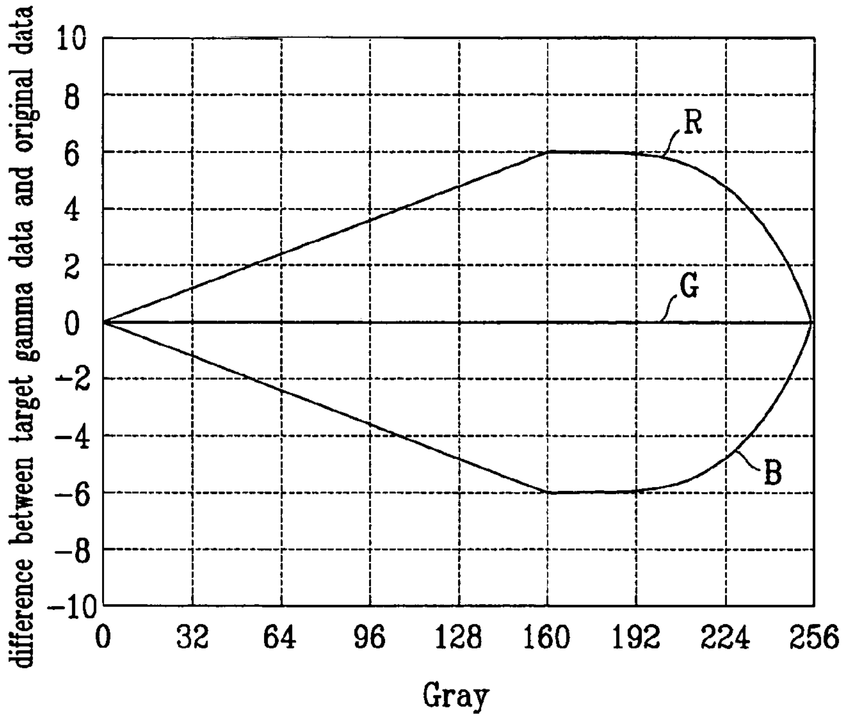
FIG. 7 is a graph illustrating the gray difference between input (original) image data and corresponding output (target) image data as function of the gray of the input image data in an LCD according to an embodiment of the present invention.
Figure 8:
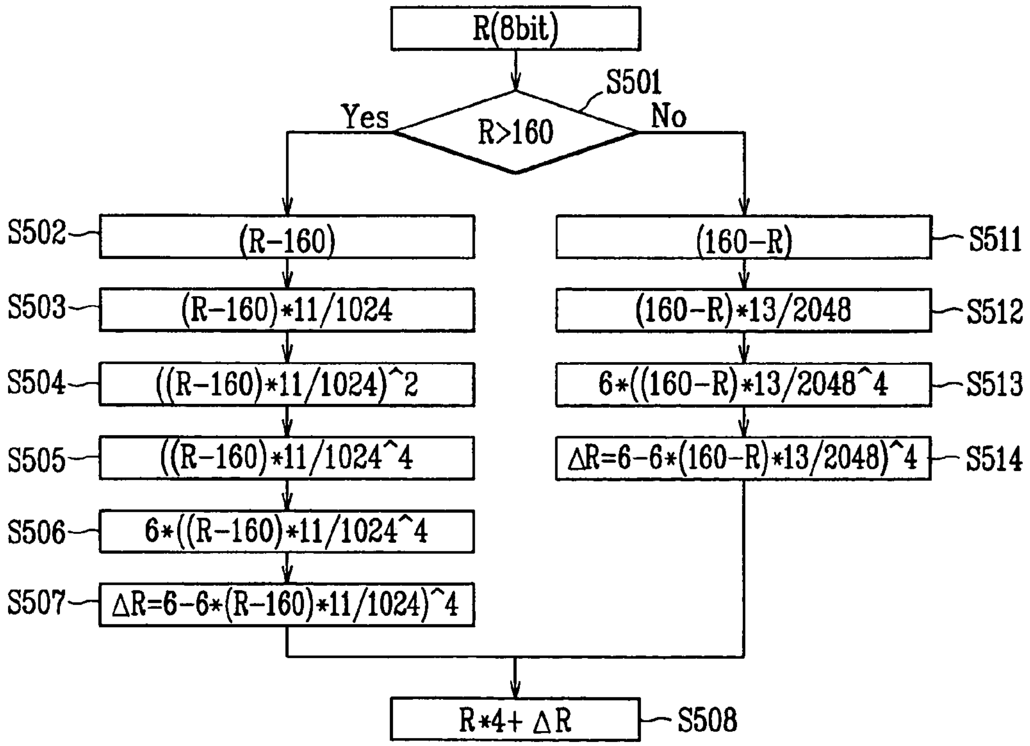
FIG. 8 is a flowchart illustrating an exemplary gamma conversion process by way of mathematical operation in an LCD according to an embodiment of the present invention.

FIG. 7 is a graph illustrating the gray difference between input (original) image data and corresponding output (target) image data as function of the gray of the input image data in an LCD according to an embodiment of the present invention, and FIG. 8 is a flowchart illustrating an exemplary gamma conversion process by way of mathematical operation in an LCD according to an embodiment of the present invention.

It is assumed that the image data RGB are 8 bit signals capable of representing 256 grays.

As shown in FIG. 7, there is no gray difference between the target image data and the original image data for green image data G, while curves illustrating the gray difference between the target image data and the original image data for red and blue image data R and B change their shape near the gray level of 160. The gray difference ΔR and ΔB between the original data and the target data for red and blue image data R and B can be approximately expressed by:

$$\Delta R = 6 - \frac{6\times(160-R)}{160} \text{ when } R < 160, \text{ and} \tag{1}$$

$$\Delta R = 6 - \frac{6\times(R-160)^4}{(255-160)^4} \text{ when } R \geq 160; \text{ and}$$

$$\Delta B = -6 + \frac{6\times(160-B)}{160} \text{ when } B < 160, \text{ and} \tag{2}$$

$$\Delta B = -6 + \frac{6\times(B-160)^4}{(255-160)^4} \text{ when } B \geq 160,$$

where R and B are the grays of the original data for red and blue image data, respectively. As shown in FIG. 7, the gray difference curves ΔR and ΔB are symmetrical and have values less than the critical value that are shown by a linear portion of their respective difference curve. Further, the gray difference curves ΔR and ΔB have values greater than the critical value that are shown by a quartic (4th power) portion of their respective difference curve. The linear and quartic portions of each curve intersect at the critical value.

First, as shown in FIG. 8, when an 8 bit red image data are input, it is determined whether the gray R of the input data is larger than a critical value of "160" (S501).

When the input gray R is larger than the critical value, the critical value is subtracted from the input gray (S502). Then, the resultant value (R−160) may be multiplied by 1/(255−160). However, since 1/(255−160) is roughly approximated to 11/1024(=$2^{10}$), for the purpose of simplification, (R−160) is multiplied by 11 and the lower 10 bits are rounded off (S503). Thereafter, (R−160)×11/1024 may be squared twice in a sequential manner. These operations can be made by way of a pipeline on ASIC (S504, S505). The resultant value of $((R-160)\times 11/1024)^4$ is multiplied by 6 (S506) and the resultant value of $6\times(((R-160)\times 11/1024)^4)$is subtracted from 6, thereby obtaining the value of ΔR in accordance with Relation 1 (S507).

When the input gray R is smaller than the critical value in the step 501, the input gray R are subtracted from the critical value (S511). Then, the resultant value (160−R) may be multiplied by 1/160. However, since 1/160 is roughly approximated to 13/2048(=$2^{11}$), (160−R) is multiplied by 13 and then the lower 11 bits are rounded off (S512). Thereafter, (160−R)×13/2048 is multiplied by 6 (S513). The resultant value of ((160−R)×13/2048)×6 from the step S513 is subtracted from 6, thereby obtaining the value of ΔR in accordance with Relation 1 (S514).

In order to get 10 bit output data from ΔR obtained at the step S507 or S514, the 8 bit input data is multiplied by "4" to be converted into 10 bit data and is added to the calculated value ΔR (S508).

Similarly, blue output image data B' can be calculated based on Relation 2.

The gamma conversion by way of a mathematical operation does not require a memory for storing a look-up table. The storage capacity of ROM or RAM required for storing the look-up table is considerably great. For instance, the storage capacity of 6144 (3×256×8) bits are required for 8 bit image data. Accordingly, the gamma conversion according to this embodiment removes a large amount of storage capacity and reduces the power consumption due to the memory.

A method of driving an LCD according to an embodiment of the present invention will be now described with reference to FIG. 9.

Figure 9:
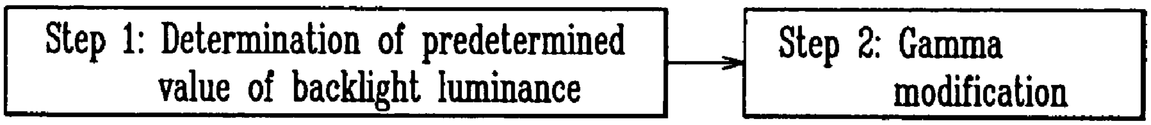
FIG. 9 illustrates a method of driving an LCD in a sRGB color space according to an embodiment of the present invention.

FIG. 9 illustrates a method of driving an LCD in a sRGB color space according to an embodiment of the present invention.

As shown in FIG. 9, a method of driving an LCD including a backlight unit according to an embodiment of the present invention includes a first step for controlling the backlight and a second step for gamma correction. The backlight unit includes at least one lamp and an inverter for controlling the lamp.

In the first step, the inverter is controlled such that the lamp emits light with a luminance equal to or larger than 80 cd/m$^2$, which is required for the sRGB color space.

The second step includes the substeps of luminance control and gamma conversion as described above. In detail, the luminance of the image data is controlled such that the luminance level represented by a predetermined gray level of image data be 80 cd/m$^2$, and the gamma characteristic of the input image data are converted to be adapted to the gamma 2.2 curve.

As described above, the luminance of the backlight is determined to be a specific value larger than 80 cd/m$^2$, and the luminance of the image data is controlled such that the luminance of the input image data satisfies 80 cd/m$^2$ at the specific image data value. In this way, the sRGB mode can be realized with the LCD, and the display quality of the LCD can be improved.

While the present invention has been described in detail with reference to the embodiments, those skilled in the art will appreciate that various modifications and substitutions can be made thereto without departing from the spirit and scope of the present invention as set forth in the appended claims.

What is claimed is:

1. A liquid crystal display, comprising:
- a signal controller, including
  - a luminance controller processing input image data with respective grays such that the luminance represented by a predetermined gray of the input image data is about 80 cd/m$^2$, and
  - a gamma converter outputting output image data having a gamma characteristic adapted to a gamma 2.2 curve based on input image data, the gamma converter output being determined using a mathematical operation based on at least one difference curve and without using a look up table;
- a data driver selecting and outputting gray voltages corresponding to the image data from the signal controller; and,
- an inverter controlling a lamp such that the lamp emits light with luminance equal to or greater than 80 cd/m$^2$, and
- wherein the at least one difference curve has intersecting linear and quartic portions, and a critical value where the linear and quartic portions intersect.

2. The liquid crystal display of claim 1, wherein the processing of the luminance controller includes addition of a predetermined data value to the input image data such that the luminance represented by the predetermined gray of the input image data be 80 cd/m$^2$.

3. The liquid crystal display of claim 1, wherein the gamma converter comprises an R data modifier, a G data modifier and a B data modifier for performing the gamma conversion for the input image data for respective red, green and blue colors, and each of the data modifiers maps the input image data into output image data having a gamma characteristic adapted to the gamma 2.2 curve.

4. The liquid crystal display of claim 3, wherein the data modifiers include a non-volatile memory.

5. The liquid crystal display of claim 1, wherein the gamma converter comprises an R data modifier, a G data modifier and a B data modifier for performing the gamma conversion for the input image data for respective red, green and blue colors, the liquid crystal display further comprises a target image data storage storing a map from the input image data into output image data having a gamma characteristic adapted to the gamma 2.2 curve and a controller loading the map stored in the target image data storage into the data modifiers, and the data modifiers select the output image data corresponding to the input image data from the loaded map and outputting the selected output image data.

6. The liquid crystal display of claim 5, wherein the data modifiers comprise a volatile memory, and the target image data storage comprises a nonvolatile memory element.

7. The liquid crystal display of claim 5, wherein the target image data storage includes a nonvolatile memory in the signal controller and a nonvolatile memory element provided external to the signal controller.

8. The liquid crystal display of claim 1, wherein the gamma converter obtains the output image data from the input image data by way of a mathematical operation.

9. The liquid crystal display of claim 1, wherein the at least one difference curve includes a red color difference curve and a blue color difference curve, the red color difference curve being symmetrical to the blue color difference curve.

10. The liquid crystal display of claim 9, wherein the red color difference curve is a function of an 8-bit gray level value R having a critical value at a gray level of 160 and corresponding to a gray difference ΔR specified by $$\Delta R = 6 - \frac{6\times(160-R)}{160} \text{ when } R < 160, \text{ and,}$$

$$\Delta R = 6 - \frac{6\times(R-160)^4}{(255-160)^4} \text{ when } R \geq 160.$$

11. The liquid crystal display of claim 9, wherein the blue color difference curve is a function of an 8-bit gray level value B having a critical value at a gray level of 160 and corresponding to a gray difference ΔB specified by $$\Delta B = -6 + \frac{6 \times (160 - B)}{160} \text{ when } B < 160, \text{ and,}$$

$$\Delta B = -6 + \frac{6 \times (B - 160)^4}{(255 - 160)^4} \text{ when } B \geq 160.$$

12. A method of driving a liquid crystal display, the method comprising:

controlling luminance of a backlight to be larger than about 80 cd/m$^2$;

controlling luminance of image data such that the luminance level represented by a predetermined gray of input image data is about 80 cd/m$^2$; and, converting the gamma characteristic of the input image data to be adapted to a gamma 2.2 curve to provide a gamma converter output, the gamma convener output being determined using a mathematical operation based on at least one difference curve and without using a look up table, and wherein the at least one difference curve has intersecting linear and quartic portions, and a critical value where the linear and quartic portions intersect.

13. The method of claim 12, wherein the gamma characteristic conversion includes a mathematical operation realized on an application specific integrated circuit (ASIC).

14. The method of claim 12, wherein the at least one difference curve includes a red color difference curve and a blue color difference curve, the red color difference curve being symmetrical to the blue color difference curve.

15. The method liquid crystal display of claim 14, wherein the red color difference curve is a function of an 8-bit gray level value R having a critical value at a gray level of 160 and corresponding to a gray difference ΔR specified by $$\Delta R = 6 - \frac{6 \times (160 - R)}{160} \text{ when } R < 160, \text{ and,}$$

$$\Delta R = 6 - \frac{6 \times (R - 160)^4}{(255 - 160)^4} \text{ when } R \geq 160.$$

16. The method of claim 14, wherein the blue color difference curve is a function of an 8-bit gray level value B having a critical value at a gray level of 160 and corresponding to a gray difference ΔB specified by $$\Delta B = -6 + \frac{6 \times (160 - B)}{160} \text{ when } B < 160, \text{ and,}$$

$$\Delta B = -6 + \frac{6 \times (B - 160)^4}{(255 - 160)^4} \text{ when } B \geq 160.$$

* * * * *